(12) United States Patent
Mazurczyk et al.

(10) Patent No.: US 9,450,678 B2
(45) Date of Patent: Sep. 20, 2016

(54) SYSTEM AND METHOD USING SPECTRAL SHAPING AND EXPANDED CHANNEL SPACING

(71) Applicant: Tyco Electronics Subsea Communications LLC, Eatontown, NJ (US)

(72) Inventors: Matthew V. Mazurczyk, Middletown, NJ (US); Oleg Sinkin, Long Branch, NJ (US); Dmitri Foursa, Colts Neck, NJ (US); Alexei N. Pilipetskii, Colts Neck, NJ (US)

(73) Assignee: Tyco Electronics Subsea Communications LLC, Eatontown, NJ (US)

(*) Notice: Subject to any disclaimer, the term of this patent is extended or adjusted under 35 U.S.C. 154(b) by 0 days.

(21) Appl. No.: 14/503,966

(22) Filed: Oct. 1, 2014

(65) Prior Publication Data

US 2015/0104181 A1    Apr. 16, 2015

Related U.S. Application Data

(60) Provisional application No. 61/890,620, filed on Oct. 14, 2013.

(51) Int. Cl.
| | |
|---|---|
| *H04B 10/58* | (2013.01) |
| *H04B 10/50* | (2013.01) |
| *H04B 10/516* | (2013.01) |
| *H04B 10/2575* | (2013.01) |
| *H04B 10/2543* | (2013.01) |
| *H04B 10/508* | (2013.01) |

(52) U.S. Cl.
CPC ........ *H04B 10/516* (2013.01); *H04B 10/2543* (2013.01); *H04B 10/2575* (2013.01); *H04B 10/508* (2013.01); *H04B 10/5162* (2013.01)

(58) Field of Classification Search
CPC ............ H04B 10/2543; H04B 10/508; H04B 10/2575; H04B 10/516; H04B 10/5162
USPC ......................................... 398/115, 182–201
See application file for complete search history.

(56) References Cited

U.S. PATENT DOCUMENTS

| | | | |
|---|---|---|---|
| 5,526,162 A | 6/1996 | Bergano | |
| 6,556,326 B2 | 4/2003 | Bergano | |
| 7,330,667 B2* | 2/2008 | Fells | H04B 10/58 398/158 |
| 7,356,264 B2* | 4/2008 | Mahgerefteh | H04B 10/25137 398/193 |
| 7,483,639 B2* | 1/2009 | Hoshida | H01S 3/302 398/157 |
| 7,561,797 B1* | 7/2009 | Harley | H04B 10/0793 398/193 |

(Continued)

OTHER PUBLICATIONS

Wang et al, Generation of Spectrally Efficient Nyquist WDM QPSK Signals using DSP Techniques at Transmitter, Mar. 2012, IEEE, pp. 1-3.*

(Continued)

*Primary Examiner* — Ken N Vanderpuye
*Assistant Examiner* — Dibson Sanchez

(57) ABSTRACT

A system and method including a transmitter including digital signal processor for providing a shaped data output in response to an input data stream. The shaped data output is coupled to a modulator that modulates an optical signal in response to the shaped data output to provide a non-rectangular shaped output having channel spacing greater than Nyquist channel spacing. Providing a shaped output consistent the present disclosure mitigates the effects of non-linear impairments in an optical transmission system.

10 Claims, 6 Drawing Sheets

(56) References Cited

U.S. PATENT DOCUMENTS

| | | | | |
|---|---|---|---|---|
| 8,731,413 | B1* | 5/2014 | Dave | H04B 10/25137 398/202 |
| 8,768,177 | B2* | 7/2014 | Wu | H04J 14/026 398/194 |
| 2002/0033984 | A1* | 3/2002 | Yonenaga | H04B 10/505 398/182 |
| 2004/0052535 | A1* | 3/2004 | Nohara | H04B 10/11 398/189 |
| 2004/0141569 | A1* | 7/2004 | Agazzi | H04B 10/2575 375/302 |
| 2006/0245765 | A1* | 11/2006 | Elahmadi | H04B 10/2513 398/189 |
| 2008/0019703 | A1* | 1/2008 | Burchfiel | H04B 10/505 398/183 |
| 2009/0238580 | A1* | 9/2009 | Kikuchi | H04B 10/25137 398/192 |
| 2011/0176813 | A1* | 7/2011 | Kim | H04B 10/516 398/147 |
| 2012/0082453 | A1* | 4/2012 | Wu | H04J 14/026 398/48 |
| 2012/0082459 | A1* | 4/2012 | Wu | H04B 10/616 398/79 |
| 2012/0082466 | A1 | 4/2012 | Wu et al. | |
| 2013/0315598 | A1* | 11/2013 | Marom | H04J 14/0224 398/79 |
| 2014/0294393 | A1* | 10/2014 | Lowery | H04B 10/548 398/76 |

OTHER PUBLICATIONS

Chantelain et al, A family of Nyquist pulses for coherent optical communications, Apr. 2012, Optics Express, vol. 20 No. 8, pp. 8397-8416.*

Wang et al, Optimization of DSP to Generate Spectrally Efficient 16QAM Nyquist WDM Signals, Apr. 2013, IEEE, pp. 772-775.*

International Search Report, International Application No. PCT/US2014/059266, International Filing Date Oct. 6, 2014.

Ramantanis et al., "Spectral Shaping Tradeoffs in Root-Raised-Cosine PDM-QPSK Nonlinear Transmission", 2012 38th European Conference and Exhibition on Optical Communications, OSA, Sep. 16, 2012, pp. 1-3.

Ogasahara et al., "Experimental Verification of the Mitigation of Intra-Channel Nonlinear Impairments Based on Digital Spectral Shaping with 50Gbps PM-IRZ-QPSK Signal Over 10,080km Transmission", 2012 38th European Conference and Exhibition on Optical Communications, OSA, Sep. 16, 2012, pp. 1-3.

Zhou et al., "64-Tb/s (640×107-Gb/s) PDM-36QAM Transmission Over 320km using Both Pre- and Post-Transmission Digital Equalization", Optical Fiber Communication (OFC), Collocated National Fiber Optic Engineers Conference, 2010 Conference on (OFC/NFOEC), IEEE, Piscataway, NJ, USA, Mar. 21, 2010, pp. 1-3.

* cited by examiner

SYSTEM AND METHOD USING SPECTRAL SHAPING AND EXPANDED CHANNEL SPACING

CROSS REFERENCE TO RELATED APPLICATION

The present application claims the benefit of the filing date of U.S. provisional application Ser. No. 61/890,620, filed Oct. 14, 2013, the teachings of which are hereby incorporated herein by reference.

TECHNICAL FIELD

The present disclosure relates to optical signal transmission and detection, and more particularly, to a system and method using spectral shaping and expanded channel spacing.

BACKGROUND

To maximize the transmission capacity of an optical fiber transmission system, a single optical fiber may be used to carry multiple optical signals in what is called a wavelength division multiplexed (WDM) system. The multiple optical signals may be multiplexed to form a multiplexed signal or WDM signal with each of the multiple signals being modulated on a separate channel. Each channel may be centered on an associated wavelength that is separated from adjacent channels by a defined channel spacing, e.g. according to a channel plan established by the International Telecommunications Union (ITU). The range of wavelengths that may be transmitted on the system is known as the system bandwidth. Systems may utilize their system bandwidth to carry a desired number of channels with desired modulation format and bit rate.

Long distance, e.g. transoceanic, optical fiber transmission paths carrying WDM signals are subject to a host of impairments that impact the shape of the WDM signal, causing distortion of the signal at the receiver. The impairments imparted to the signal on the transmission path include both linear and non-linear impairments. The source of these impairments include, for example, amplified spontaneous emission (ASE) noise generated in Erbium-Doped Fiber-Amplifiers (EDFAs), nonlinear effects caused by dependence of an optical fiber's index on the intensity of the propagating light, chromatic dispersion, polarization mode dispersion, and crosstalk between channels caused by the fiber's nonlinear index.

The impairments are impacted in a WDM system by the system channel spacing. In general, narrow channel spacing is desirable because it allows more efficient use of the system bandwidth. Unfortunately, linear and non-linear transmission impairments can be exacerbated with increasingly narrow channel spacing.

With respect to linear impairments, it is known that by using matched filters with a rectangular shape at the transmitter and receiver, the channel spacing for the system may be reduced to equal the symbol rate (symbols transmitted per second) without a loss of linear performance. A system having channel spacing equal to the system symbol rate is referred to as having Nyquist channel spacing.

Although Nyquist channel spacing may be the optimal channel spacing in terms of linear performance, it is generally not the optimal channel spacing with respect to non-linear performance. It has been found that the effect of non-linear impairments can be reduced by channel spacing that is larger than Nyquist channel spacing, i.e. by spectral broadening. For example, spectral broadening by means of synchronous amplitude or phase modulation is known for reducing non-linear impairments in direct detection systems, as described in U.S. Pat. Nos. 5,526,162 and 6,556,326, the teachings of which are hereby incorporated herein by reference.

While known methods have been effective in reducing the effects of linear and non-linear impairments, it is desirable to further improve the performance of long-distance optical transmission systems.

BRIEF DESCRIPTION OF THE DRAWINGS

Reference should be made to the following detailed description which should be read in conjunction with the following figures, wherein like numerals represent like parts.

DETAILED DESCRIPTION

In general, a system consistent with the present disclosure uses spectral shaping of the transmitted signal to mitigate the effects of both linear and non-linear impairments. The system may shape the transmitted signal using digital signal processing (DSP) to provide a shaped spectrum, i.e. a non-rectangular spectrum, with channel spacing greater than the Nyquist channel spacing. The spectrum may be shaped to establish a nominally zero inter-symbol interference (ISI) at the receiver. For example, the transmitted spectrum may be provided with a raised cosine or step function shape having channel spacing greater than the Nyquist channel spacing. The receiver may detect the transmitted signal using coherent detection and matched filtering.

Figure 1:
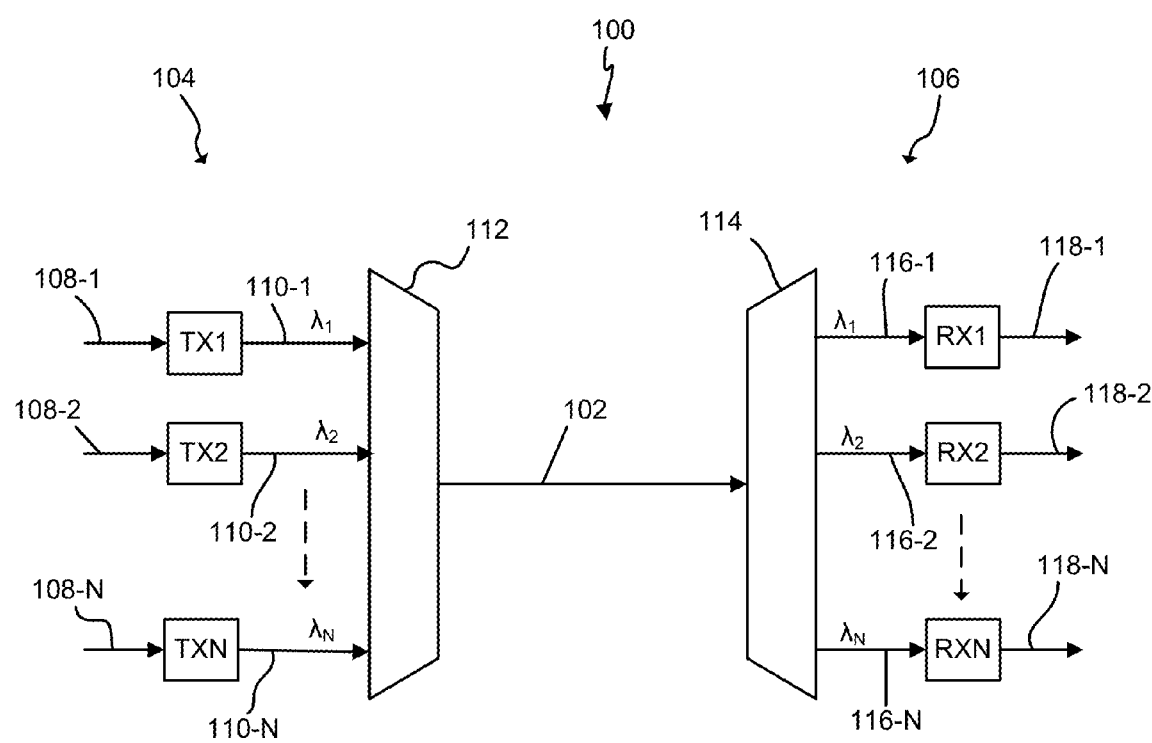
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals, including, for example, terrestrial systems and short-reach systems.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on an associated wavelength $\lambda_1, \lambda_2 \ldots \lambda_N$, e.g. with a fixed system bandwidth and a fixed total signal power (i.e. the sum of power all channels). One or more of the transmitters TX1, TX2 . . . TXN may be configured to shape the transmitted signals using DSP to mitigate the effects of linear and non-linear impairments consistent with the present disclosure. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to detect and demodulate the received signal using coherent detection and DSP, and may provide an associated output data signal on an associated output path 118-1, 118-2, 118-3, 118-N.

Figure 2:
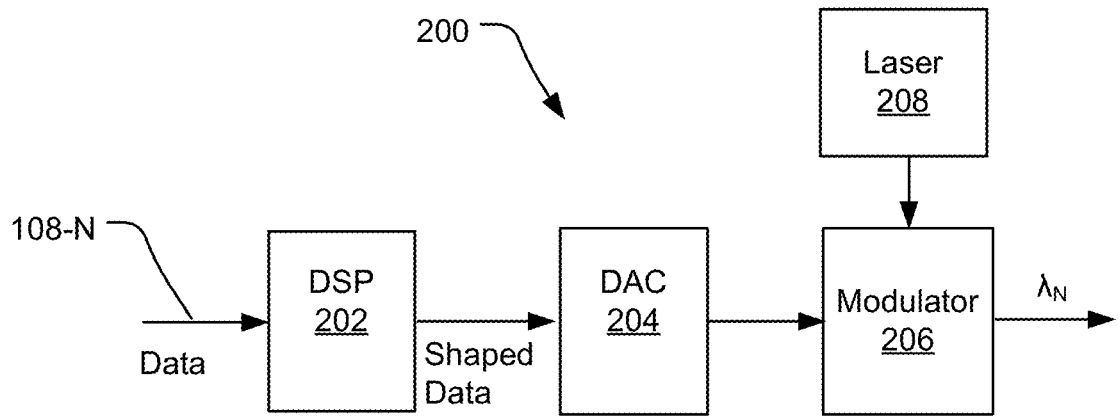
FIG. 2 is a block diagram of one exemplary embodiment of a transmitter consistent with the present disclosure.

FIG. 2 is a simplified block diagram of one exemplary transmitter 200 consistent with the present disclosure. The illustrated exemplary embodiment 200 includes a digital signal processor (DSP) 202, a digital-to-analog converter (DAC) 204, and a modulator 206 for modulating the output of a continuous-wave laser 208 for providing a modulated output on a carrier wavelength $\lambda_N$.

As will be described in greater detail, the DSP 202 may be configured to receive input digital data on path 108-N and provide a shaped data output coupled to the DAC 204. As is known, DSP involves processing of signals using one or more application specific integrated circuits (ASICS) and/or special purpose processors configured for performing specific instruction sequences, e.g. directly and/or under the control of software instructions.

The DAC 204 may convert the shaped data output from the DSP 204 to an analog signal coupled to the modulator 206. The modulator 206 may modulate the carrier wavelength $\lambda_N$ of the continuous wave laser 208 in response to the output of the DAC 204 using any known modulation method. The modulator thus provides an output having a power spectral density determined by the shaped data output of the DSP. The shaped output of the modulator 206 may be coupled to the multiplexer 112 (FIG. 1) in a WDM system.

Figure 3:
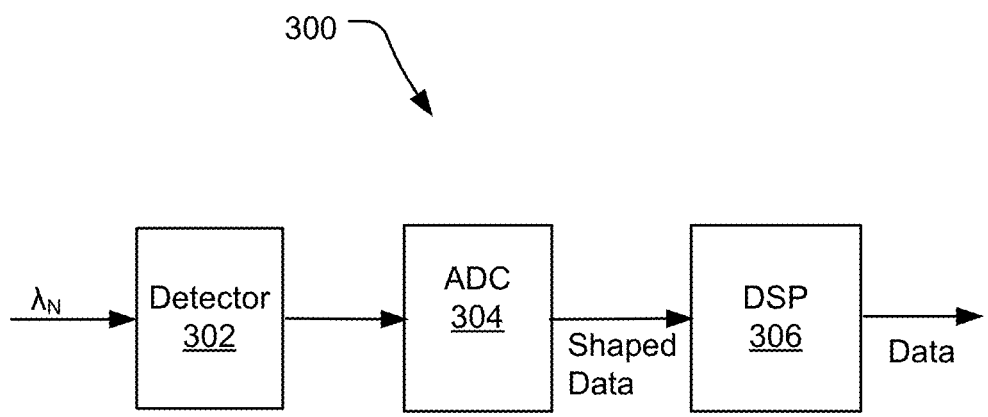
FIG. 3 is a block diagram of one exemplary embodiment of a receiver consistent with the present disclosure.

FIG. 3 is a simplified block diagram of one exemplary receiver 300 consistent with the present disclosure. The illustrated exemplary embodiment 300 includes an optical signal detector 302, an analog-to-digital converter (ADC) 304, and a DSP 306. The detector 302 may include a known coherent receiver, e.g. a polarization diversity coherent receiver, configured to receive the signal on the optical carrier wavelength $\lambda_N$ and convert the optical signal into one or more associated electrical outputs (e.g. an output associated with each polarization in a polarization multiplexed modulation format) representative of the data modulated on the optical carrier wavelength $\lambda_N$ by the modulator 206 (FIG. 2). Coherent receivers are known and use coherent detection, e.g. homodyne or heterodyne detection, to detect modulated optical signals. The term "coherent" when used herein in relation to a receiver refers to a receiver including a local oscillator (LO) for detecting the received signal.

The electrical output of the detector is coupled to the ADC 304. The ADC converts the detector output to a digital signal representative of the shaped data provided at the output of the DSP 202 (FIG. 2). The output of the ADC is coupled to the DSP 306. The DSP 306 demodulates the signal and provides an output representative of the data provided at the input to the DSP 202 (FIG. 2).

Those of ordinary skill in the art will recognize that the specific configuration of a transmitter and receiver in a system consistent with the present disclosure will depend on the modulation format used in the system. For example, in a phase modulated system such as a quadrature amplitude modulated (QAM) system, the DSP 202 in the transmitter may include digital filtering for the real and imaginary parts of the input data.

Figure 4:
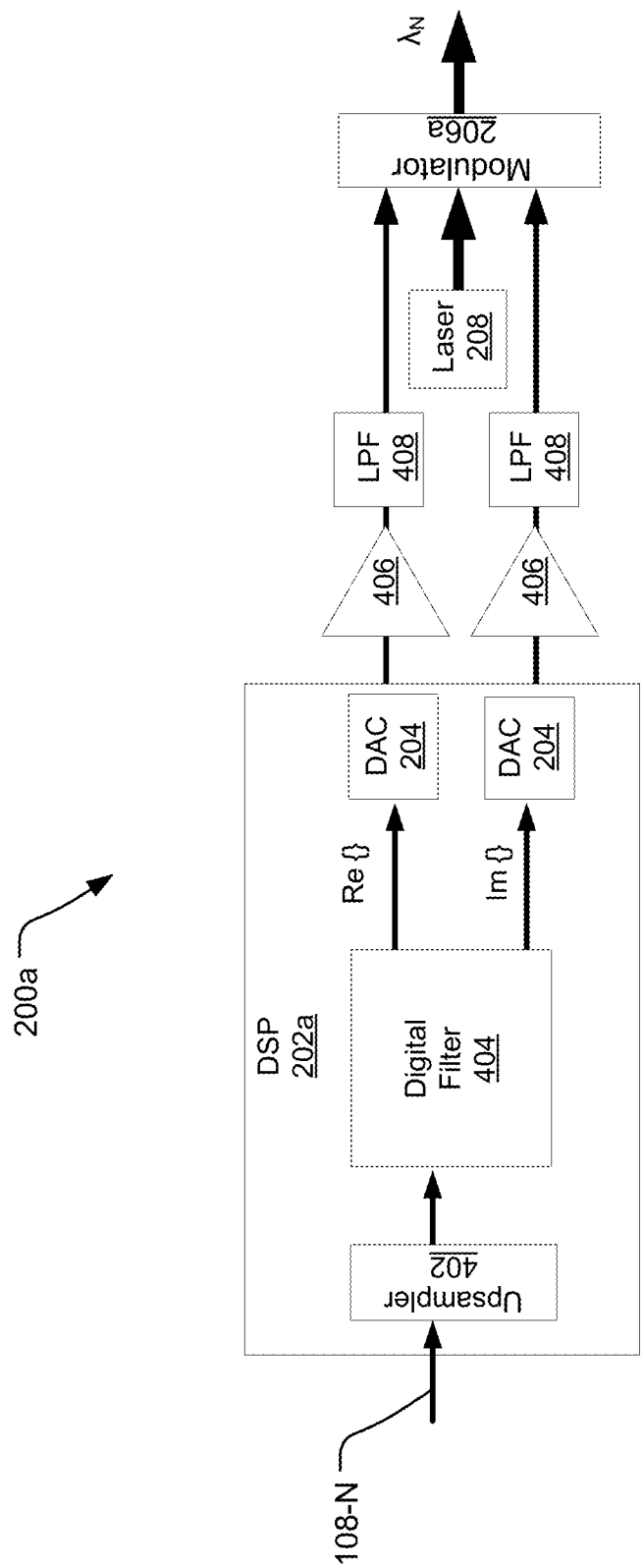
FIG. 4 is a block diagram of one embodiment of the transmitter illustrated in FIG. 2.

FIG. 4, for example, is a simplified block diagram of an embodiment 200a of the transmitter 200 (FIG. 2) useful in connection with a phase modulated system. In the illustrated embodiment, the transmitter 200a includes an embodiment 202a of the DSP 202 (FIG. 2) including an upsampler 402, a digital filter 404, and first and second DACs 204. In a known manner, the upsampler 402 samples the input data at a rate higher than the data rate and provides a sampled signal to the digital filter 404. The digital filter 404 filters the output of the upsampler 402 to provide shaped data for the real Re { } and imaginary Im { } portions of the signal, respectively, to associated DACs 204. The outputs of the DACs 204 are coupled to associated linear drivers 406 and low pass filters 408 before being coupled to the modulator 206a as the real and imaginary components of the signal to be modulated on the output of the laser 208. In polarization multiplexed systems, each polarization of an input signal may be transmitted using transmitter 200a configuration as shown in FIG. 4.

In general, the DSP 202 in the transmitter shapes the transmitted signal by a function $H_T(f)$. As long as the data symbols to be transmitted are independent of each other, the transmitted power spectrum is equal to $|H_T(f)|^2$. The DSP 306 implements a matched filter having a shape $H_R(f)$.

In a system consistent with the present disclosure, the spectral shape imparted to the transmitted signal by the DSP 202 may be nominally configured to provide a condition of zero inter-symbol interference (ISI). In order to satisfy a zero ISI condition for a white Gaussian noise channel with a matched filter receiver at a symbol rate of R and WDM channel spacing of W, the Fourier transform X(f) of the filtered and sampled signal at the receiver should nominally satisfy:

$$\sum_{m=-\infty}^{\infty} X(f-mR)=1 \quad \text{(equation 1)}$$

This condition allows for a variety of spectral forms when W>R. Given that the most bandwidth-efficient zero-ISI WDM occurs with a nominally rectangular spectral shape when W=R, the condition that W=R may be used as a reference point while increasing W. The value of W may be maintained to W<2R for simplicity. With this restriction, the power spectral density of the signal S(f) has should nominally satisfy the following vestigial symmetry condition for zero ISI (normalizing the spectrum to a value of 1 for convenience):

$$S(f)=1 \text{ for } |f| \leq R-W/2,$$

$$S(f)+S(f-R)=1 \text{ for } R-W/2 \leq f \leq W/2,$$

and $$S(f)+S(f+R)=1 \text{ for } -W/2 \leq f \leq W/2-R \quad \text{(Equation 2)}$$

Figure 5:
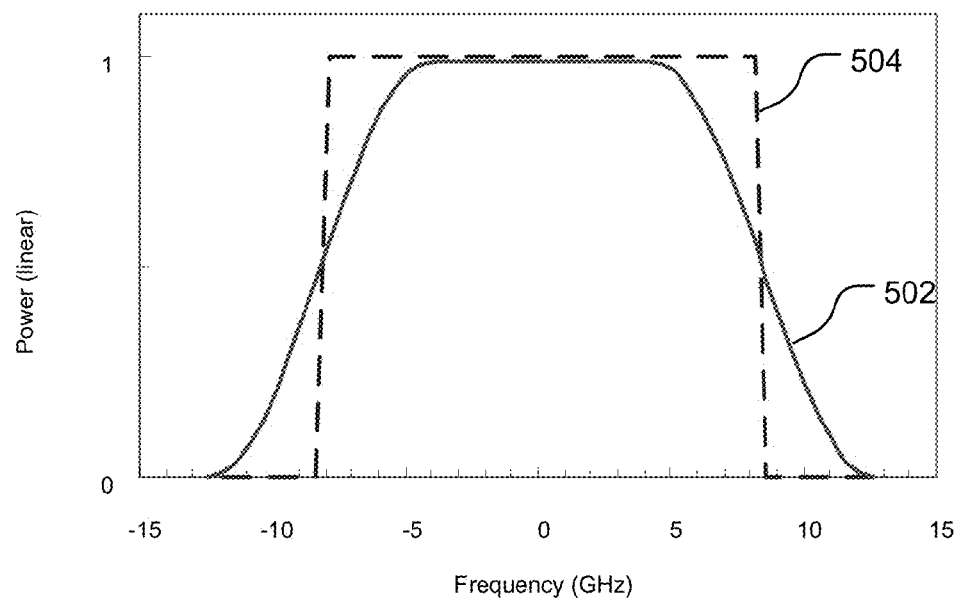
FIG. 5 is a plot of normalized power vs. frequency illustrating a spectral shape of a transmitted signal consistent with the present disclosure.
Figure 6:
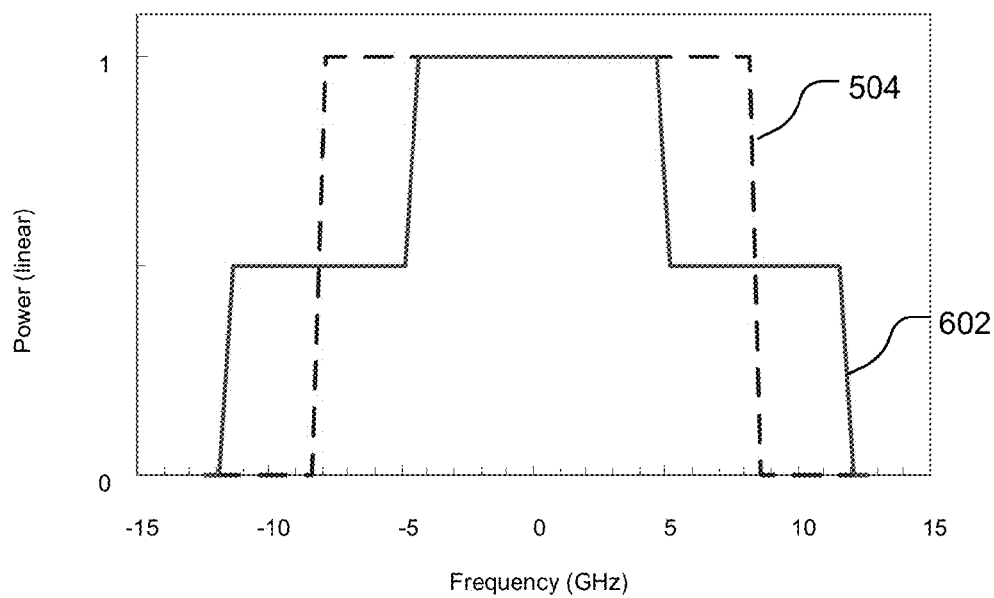
FIG. 6 is a plot of normalized power vs. frequency illustrating another spectral shape of a transmitted signal consistent with the present disclosure.

A variety of spectral shapes may be established by the DSP 202 to satisfy the conditions of equation 2. FIGS. 5 and 6, for example, include plots 502, 602 of normalized spectral power density vs. frequency for a raised cosine and a step function, respectively, satisfying these conditions. For simplicity and ease of explanation, FIGS. 5 and 6 use W=23.5 GHz and R=16.7 GHz. Those of ordinary skill in the art will recognize that other values for W and R may be used. The dashed lines 504 in FIGS. 5 and 6 are plots of the Nyquist spectrum, i.e. a rectangular function with Nyquist channel spacing, for comparison.

For the raised cosine shape illustrated in FIG. 5, inter-channel WDM crosstalk may be minimized by adjusting the roll-off of the shape. Providing greater roll-off also provides other benefits, such as providing a greater horizontal eye opening and making the signal easier for the receiver to process.

The step function illustrated in FIG. 6 has two intensity levels, i.e. 1 and ½, with transitions between the levels at f=±(R−W/2). The value of the step function is zero for |2 f|>W. With the step function, the peak of S(f) within the frequency bands −W/2≤f≤W/2−R and R−W/2≤f≤W/2 (i.e. in the shoulders of the step function) is minimized compared to other choices for S(f), while S(f) remains equal to 1 for frequencies |f|≤R−W/1.

Figure 7:
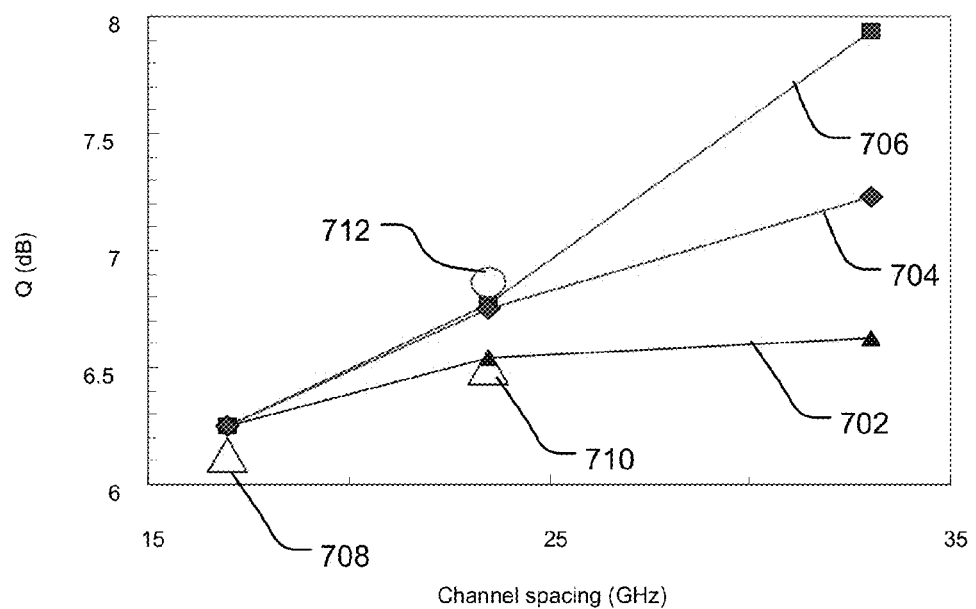
FIG. 7 is a plot of Q factor vs. channel spacing illustrating performance of a system consistent with the present disclosure.

FIG. 7 includes plots 702, 704, 706 of Q factor vs. channel spacing illustrating theoretical performance of a system using spectral shaping consistent with the present disclosure. FIG. 7 also includes open symbols 708, 710 and 712 corresponding to experimental results for Q factor vs. channel spacing illustrating actual performance of a system using spectral shaping consistent with the present disclosure. Plot 702 is a plot of Q factor vs. channel spacing for Nyquist spectrum, as illustrated for example by plot 504 in FIGS. 5 and 6. Open symbols 708 and 710 illustrate experimental results for Q factor vs. channel spacing for a Nyquist spectrum, as illustrated for example by plot 504 in FIGS. 5 and 6. Plot 704 is a plot of Q factor vs. channel spacing for raised cosine spectral shape, as illustrated for example by plot 502 in FIG. 5. Plot 706 is a plot of Q factor vs. channel spacing for the step function spectral shape, as illustrated for example by plot 602 in FIG. 6. Open symbol 712 illustrates an experimental result for Q factor vs. channel spacing for a step function spectral shape, as illustrated for example by plot 602 in FIG. 6.

As illustrated in FIG. 7, wider channel spacing in general improves the peak Q performance. However, with the Nyquist spectrum, the performance benefit saturates with channel spacing as illustrated by plot 702. Plots 704 and 706, however, illustrate that performance improves significantly with the increase of the channel spacing when spectral shaping is consistent with the present disclosure is applied. As illustrated by plots 706 and 704, the step function spectral shape has a larger benefit compared to the raised cosine spectral shape, especially at larger channel spacing. The open symbols 708, 710 and 712 in FIG. 7 illustrate that experimental results agree with the theoretical calculations illustrated by plots 702, 704 and 706.

Figure 8:
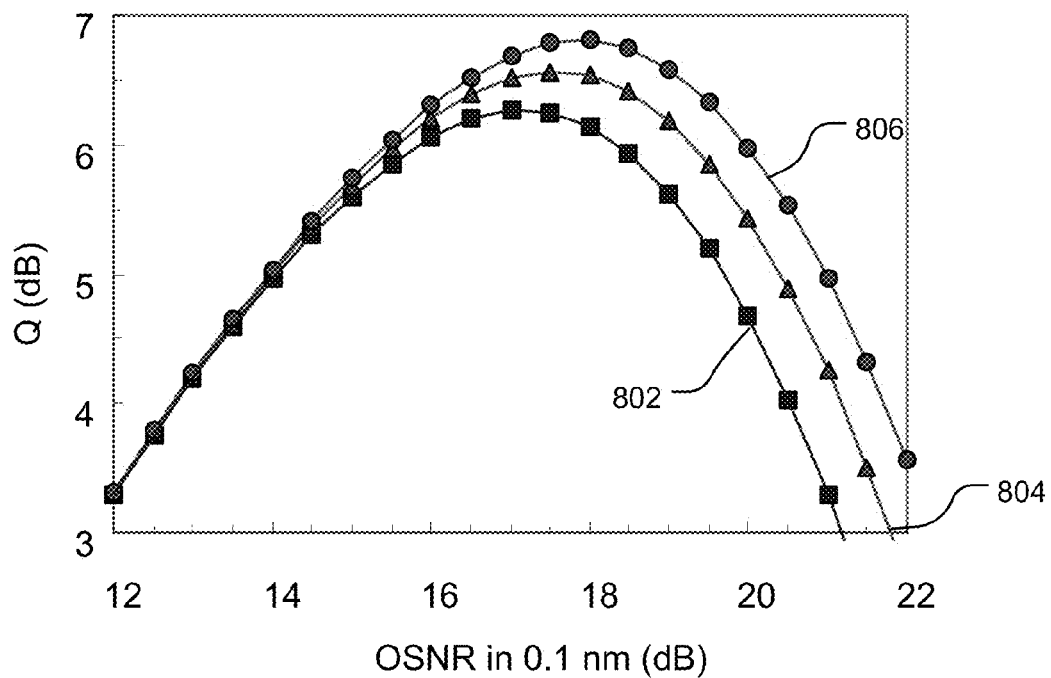
FIG. 8 is a plot of Q factor vs. optical signal-to-noise ratio illustrating performance of a system consistent with the present disclosure.

FIG. 8 includes plots 802, 804, 806 of measured Q factor vs. optical signal-to-noise ratio (OSNR) illustrating performance of a step function spectral shape consistent with the present disclosure. The plots in FIG. 8 were obtained from a system with 8, 16 QAM channels with a symbol rate of 16.64 GBs, 28% FEC overhead and a net data rate of 104 Gb/s. The channels were transmitted over a distance of 6,612 km with eleven spans having single stage EDFAs. The transmission path had an average fiber dispersion of 21.6 ps/nm/km at 1550 nm, and performance was measured at 1549 nm.

Plot 802 is a plot of performance of a spectrum approximating a Nyquist spectrum with a rectangular shape and R=16.7 and W=17 GHz. Plot 804 is a plot of performance of a spectrum approximating rectangular shape with R=16.7 and W=23.5 GHz, i.e. a rectangular shape having channel spacing greater than Nyquist spacing. Plot 806 is a plot of performance of a step function spectral shape consistent with the present disclosure with R=16.7 and W=23.5 GHz. As shown, increasing channel spacing compared to Nyquist channel spacing and shaping the transmitted spectrum to provide a step function spectral shape consistent with the present disclosure (plot 806) provides significant improvement compared to a Nyquist spectrum (plot 802) or a non-shaped (rectangular) spectrum with increased channel spacing (plot 804).

Figure 9:
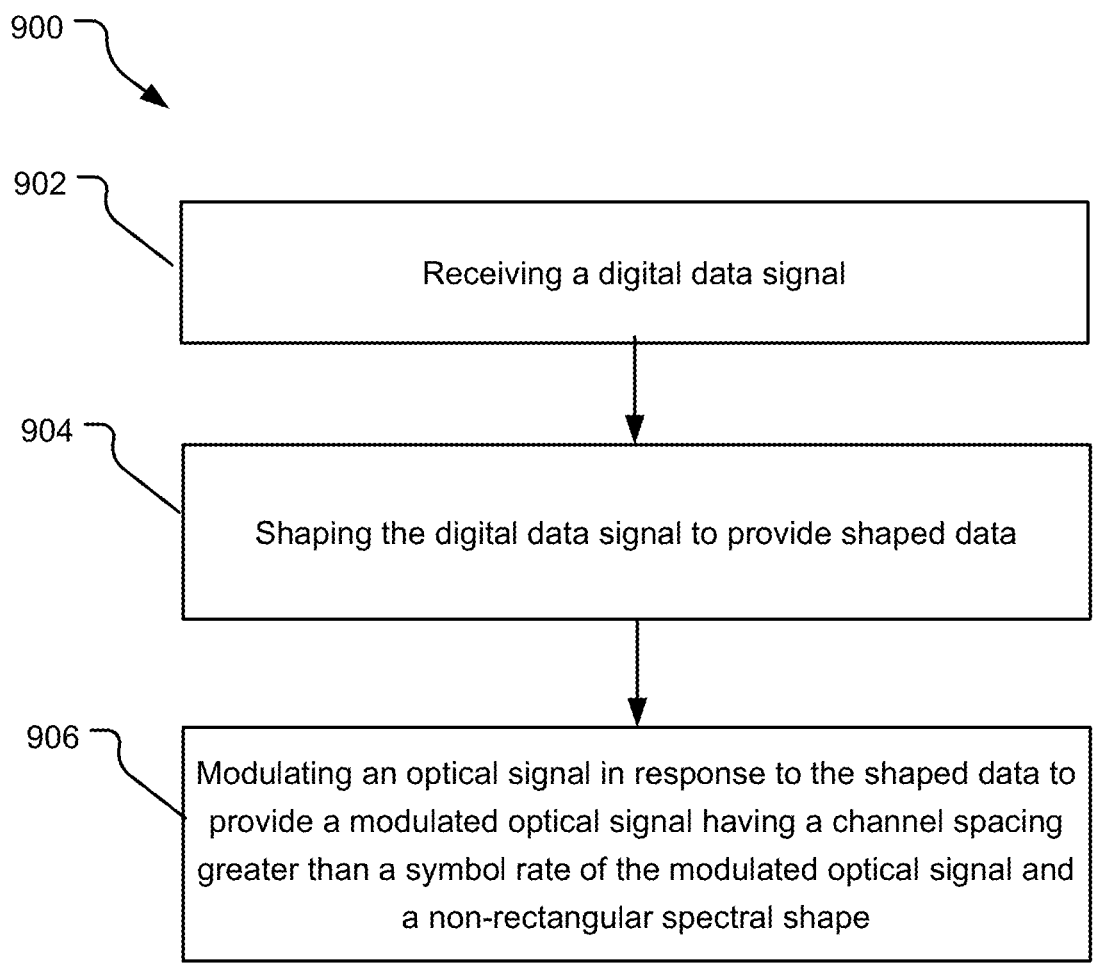
FIG. 9 is flow chart illustrating one example of a method consistent with the present disclosure.

FIG. 9 is a flow chart illustrating a method 900 consistent with the present disclosure. Operation 902 includes receiving a digital data signal. The digital data signal is shaped 904 to provide shaped data. An optical signal is modulated 906 in response to the shaped data to provide a modulated optical signal having a channel spacing greater than a symbol rate of the modulated optical signal and a non-rectangular spectral shape.

While FIG. 9 illustrates various operations according to an embodiment, it is to be understood that not all of the operations depicted in FIG. 9 are necessary for other embodiments. Indeed, it is fully contemplated herein that in other embodiments of the present disclosure, the operations depicted in FIG. 9, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect of the disclosure there is provided a system including: a digital signal processor configured to receive an input data stream and apply a transfer function to the input data stream to produced shaped data; and a modulator configured to modulate an optical signal in response to the shaped data to provide a modulated optical signal having a channel spacing greater than a symbol rate of the modulated optical signal and a non-rectangular spectral shape.

According to another aspect of the disclosure, there is provided a method of mitigating the effect of non-linear impairments in an optical communication system, the method comprising: receiving a digital data signal; shaping the digital data signal to provide shaped data; and modulating an optical signal in response to the shaped data to provide a modulated optical signal having a channel spacing greater than a symbol rate of the modulated optical signal and a non-rectangular spectral shape.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. As used herein, use of the term "nominal" or "nominally" when referring to an amount means a designated or theoretical amount that may vary from the actual amount.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system comprising:
    a digital signal processor configured to receive an input data stream and apply a transfer function to said input data stream to produce shaped data; and
    a modulator configured to modulate an optical signal in response to said shaped data to provide a modulated optical signal having a channel spacing greater than a symbol rate of said modulated optical signal and a step function spectral shape having a central portion disposed between a first and a second shoulder portion, wherein a power of said first and said second shoulder portion is approximately half of a peak power of said central portion, and a total power of said step function spectral shape is the same as a Nyquist signal.

2. A system according to claim 1, said system further comprising a digital to analog converter configured to convert said shaped data to an analog signal, and wherein said modulator is configured to modulate said optical signal in response to said analog signal.

3. A system according to claim 1, wherein said spectral shape is nominally configured to provide zero inter-symbol interference at a receiver.

4. A system according to claim 1, said system further comprising:
    a detector for receiving said modulated optical signal and providing an electrical signal representative of said optical signal; and
    a receiver digital signal processor configured to apply a matched filter corresponding to said transfer function and provide an output representative of said input data stream in response to said electrical signal.

5. A system according to claim 1, wherein said system is configured for communicating optical signals on a fixed system bandwidth and with a fixed total power for channels on said system.

6. A method of mitigating the effect of non-linear impairments in an optical communication system, said method comprising:
    receiving a digital data signal;

shaping said digital data signal to provide shaped data; and modulating an optical signal in response to said shaped data to provide a modulated optical signal having a channel spacing greater than a symbol rate of said modulated optical signal and a step function spectral shape having a central portion disposed between a first and a second shoulder portion, wherein a power of said first and said second shoulder portion is approximately half of a peak power of said central portion, and a total power of said step function spectral shape is the same as a Nyquist signal.

7. A method according to claim 6, said method further comprising converting said shaped data to an analog signal, and wherein said modulating said optical signal comprises modulating said optical signal in response to said analog signal.

8. A method according to claim 6, wherein said spectral shape is nominally configured to provide zero inter-symbol interference at a receiver.

9. A method according to claim 6, said method further comprising:

detecting said modulated optical signal at a receiver to provide an electrical signal representative of said modulated optical signal; and applying a matched filter to said electrical signal to provide an output representative of an input data stream in response to said electrical signal.

10. A method according to claim 6, wherein said system is configured for communicating optical signals on a fixed system bandwidth and with a fixed total power for channels on said system.

* * * * *